US008869303B2

(12) United States Patent
Fleysher

(10) Patent No.: US 8,869,303 B2
(45) Date of Patent: Oct. 21, 2014

(54) METHOD AND SYSTEM FOR GENERATION OF DYNAMIC PASSWORD

(71) Applicant: Mikhail Fleysher, Closter, NJ (US)

(72) Inventor: Mikhail Fleysher, Closter, NJ (US)

(*) Notice: Subject to any disclaimer, the term of this patent is extended or adjusted under 35 U.S.C. 154(b) by 125 days.

(21) Appl. No.: 13/769,304

(22) Filed: Feb. 16, 2013

(65) Prior Publication Data

US 2014/0237565 A1 Aug. 21, 2014

(51) Int. Cl.
*G06F 7/04* (2006.01)
*H04L 29/06* (2006.01)

(52) U.S. Cl.
CPC .................................. *H04L 63/083* (2013.01)
USPC .................... 726/28; 726/26; 726/27; 726/29

(58) Field of Classification Search
CPC .................................. G06F 21/31; G06F 21/32
USPC ...................................................... 726/26–29
See application file for complete search history.

(56) References Cited

U.S. PATENT DOCUMENTS

| 2005/0113070 | A1* | 5/2005 | Okabe | 455/411 |
|---|---|---|---|---|
| 2006/0015358 | A1* | 1/2006 | Chua | 705/1 |
| 2007/0284434 | A1* | 12/2007 | Fletcher | 235/379 |
| 2008/0066190 | A1* | 3/2008 | Shu et al. | 726/28 |
| 2008/0134346 | A1* | 6/2008 | Cho et al. | 726/29 |
| 2011/0041166 | A1* | 2/2011 | Mani | 726/6 |
| 2011/0314285 | A1* | 12/2011 | Hirata et al. | 713/170 |
| 2012/0005734 | A1* | 1/2012 | Ogawa | 726/6 |
| 2012/0216260 | A1* | 8/2012 | Crawford et al. | 726/5 |
| 2012/0284195 | A1* | 11/2012 | McMillen et al. | 705/71 |
| 2013/0042111 | A1* | 2/2013 | Fiske | 713/170 |

OTHER PUBLICATIONS

Graffi et al. "Practical Security in P2P-based Social Networks" 2009 IEEE 34th Conference on Local Computer Networks, pp. 269-272.*
Sakane et al. "An Authentication System Development in Application of Grid Middleware to A Nationwide Joint-Use Environment for Computing" Applications and the Internet, 2008. SAINT 2008. International Symposium on pp. 277-280.*

* cited by examiner

*Primary Examiner* — Luu Pham
*Assistant Examiner* — Roderick Tolentino

(57) ABSTRACT

A method and system of independent generation of dynamic password by a client and a server for subsequent verification of the generated password by either the server or the client is provided. The method includes registration of user ID for identification of the client and associating client's related information. Then the client provides one or more static values and one or more variable values for the registered user ID. The server then drives the base value and further the instructions are then applied on the registered ID. Thus generating the random password and further verifying the generated password with the random password and thus authorizing the client.

15 Claims, 3 Drawing Sheets

200

Static (Key) Value - 4951

Variable (Joker) Value 1 - (Friday) - 5
Variable Joker Value 2 - May 3, 2013 - 3

Instructions:

1st digit of the Key
1st Joker value
2nd digit of the Key
3rd digit of the Key
4th digit of the Key
2nd Joker value Base Value - Matrix Random Password - 459513

Generated Password - 459513

FIG. 2

|   | 0 | 1 | 2 | 3 | 4 | 5 | 6 | 7 | 8 | 9 |   |
|---|---|---|---|---|---|---|---|---|---|---|---|
| 0 | Y | S | O | J | G | O | G | O | S | G | 0 |
| 1 | O | H | G | O | H | G | O | S | H | Y | 1 |
| 2 | J | O | G | H | O | Y | S | Y | J | J | 2 |
| 3 | Y | O | J | S | S | O | G | S | G | Y | 3 |
| 4 | S | J | O | H | H | J | S | Y | O | O | 4 |
| 5 | J | G | Y | S | S | O | Y | H | S | G | 5 |
| 6 | Y | S | J | Y | Y | J | G | Y | Y | H | 6 |
| 7 | O | H | G | S | S | O | S | O | G | O | 7 |
| 8 | O | H | S | G | G | Y | H | H | S | J | 8 |
| 9 | S | J | Y | O | O | J | S | G | O | G | 9 |
|   | 0 | 1 | 2 | 3 | 4 | 5 | 6 | 7 | 8 | 9 |   |

4 x 4 - H     5 x 5 - O     9 x 9 - G 5 x 5 - O     1 x 1 - Y     3 x 3 - S

Generated Password: HOGOYS

FIG. 3

METHOD AND SYSTEM FOR GENERATION OF DYNAMIC PASSWORD

BACKGROUND OF THE INVENTION

1. Field of the Invention

The present invention generally relates to a method and system for generation of dynamic password, and more particularly relates to the method and system for generation of dynamic password from instructions applied on a base value, a static value, a variable value or any combination of some or all of these.

2. Description of Related Art

In today's world where a lot of interactions between different parties like people and computer systems are fact of life, one of the main concerns is how to identify each party. To be certain that they are who they are a common practice is to require one of the parties that acting in the client capacity to identify itself via sign in (authentication) process by providing its user id and associated password.

It is well known that a client determines a meaningful password, in the form of, for example, the name of their dog, the birth date of their child or an election year of the favorite candidate. This type of password is easily compromised with investigation. Conversely, a computer can randomly associate a password for a client, but this type of password is meaningless to the client and as such difficult to memorize. Consequently, the former method, which is simple, is insecure and the latter method, which is more secure, is difficult to use and often leads to a client writing their password next to their computer, thereby making the system insecure.

The problem with current sign in (authentication) and what makes hacking very possible is that credentials are static in nature (user id and password are set once and used many) and when supplied are transmitted between the client and authenticator. These make them vulnerable for interception for further malicious use.

To make it less vulnerable, the password that is part of transmission needs to be dynamic and of different value every time so even if intercepted will be of no use in the future. Currently there are available options for the dynamic password which are achieved by utilizing Secure ID token that changes every so often. This token is generated by either a physical device or software installed on a physical device like mobile phone or a computing device.

Therefore there is a need of a method and system for generating a common dynamic password independently by both server and client. Further, the generated password validates the client to operate through the server. Furthermore, the generated password depends upon the instructions applied on static value, base value, variable value or any combination of some or all of these.

SUMMARY OF THE INVENTION

In accordance with the teachings of the present invention, a method and system for independent generation of dynamic password by a client and a server for subsequent verification of the generated password is provided.

An objective of the present invention is to provide a method and a system for generation of dynamic password by applying instructions on static value, variable value, base value or any combination of some or all of these. Further, the generated password is verified by the random password for authentication of the client.

Another objective of the present invention is to provide a method and a system for creating a base value in the form of matrix, text, numeric or other values or any combination of some or all of these for generating the random password.

Another objective of the present invention is to provide a method and a system for providing an option of re-entering the password when the verification attempts failed as the generated password is different from the random password.

Another objective of the present invention is to provide a method and a system for providing disabling the registration of User ID on entering of wrong password for a predetermined times.

BRIEF DESCRIPTION OF DRAWINGS

FIG. 2 is a block diagram for indicating an example of generating a dynamic password; and FIG. 3 is an exemplary embodiment of determining random password through a matrix.

DETAILED DESCRIPTION OF DRAWINGS

Figure 1:
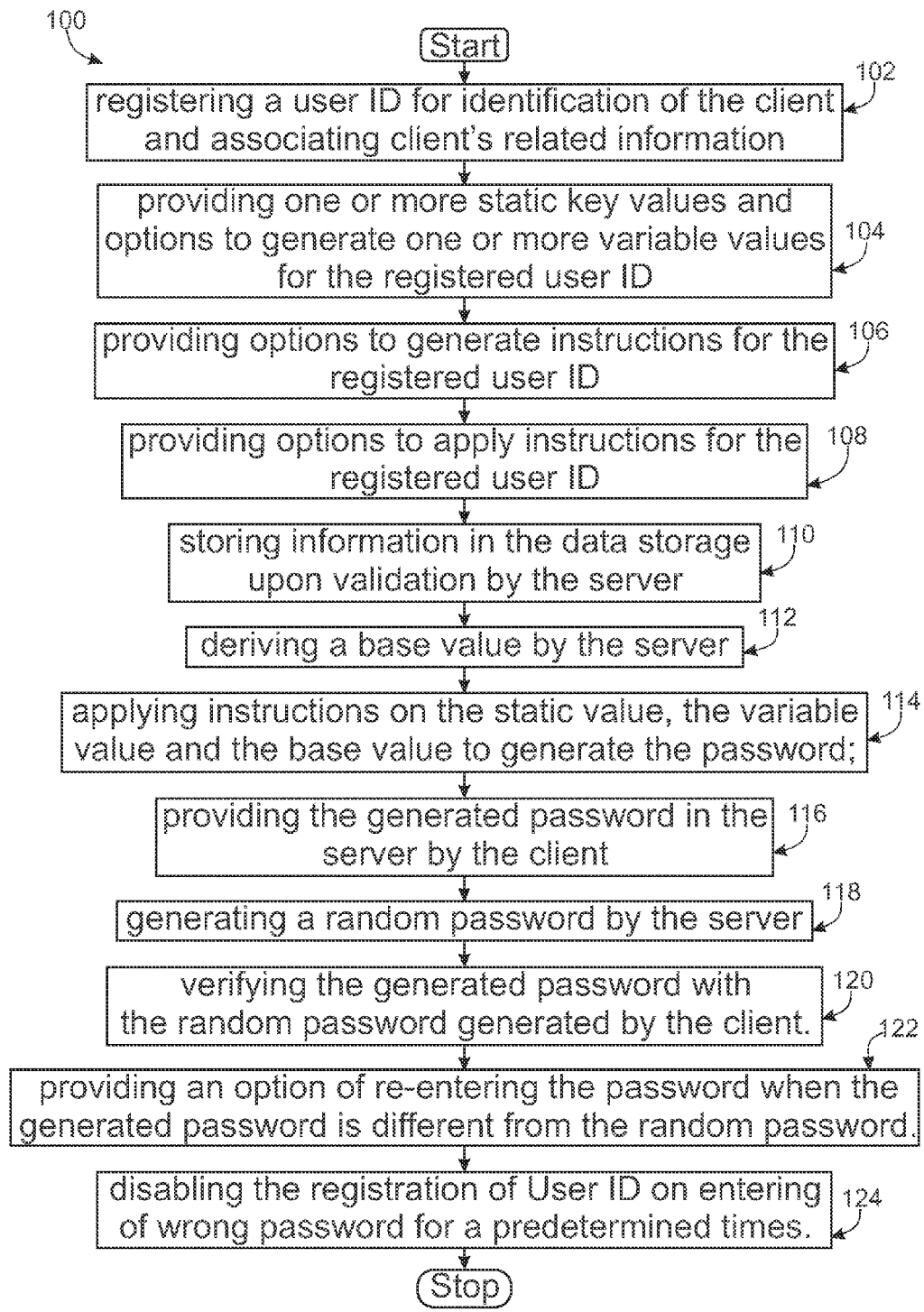
FIG. 1 is a flow diagram of a method of generation of dynamic password by a client and a server for subsequent verification of the generated password by either the server or the client, in accordance with a preferred embodiment of the present invention.

While this technology is illustrated and described in a preferred embodiment, a system and method for generating an optimized set of meeting assignments for meeting participants may be described in many different configurations, forms and various methods, without deviating from the scope of present invention. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 is a flow diagram of a method 100 of generation of dynamic password by a client and a server for subsequent verification of the generated password by either the server or the client, in accordance with a preferred embodiment of the present invention.

In a preferred embodiment, the method 100 initiates with a step 102 for registering a user ID for identification of the client and associating client's related information. The user ID is registered by the client on the server and is further stored in the data storage. Examples of user ID includes but not limited to numeric value, alphabets, characters and alphanumeric value etc. In order to prepare for the subsequent verifications processes, the client has to register with the server and creates the user ID which is submitted to the server with request to register the client. The server than responds with a facility screen where client may enter detailed information required to register the user ID. The server then provides a screen for the client to provide detailed information regarding the requirements on generation of dynamic password.

The step 102 is followed by a step 104 for providing one or more static values and options to generate one or more variable values for the registered user ID. In a preferred embodiment of the present invention, the client enters one or more static values and options to generate one or more variable values to the server.

The step 104 is then followed by a step 106 is providing options to generate instructions for the registered user ID. Examples of instructions include but not limited to mathematical operators, logical operations, locating operations, selection operations, mixing values operations, or any mixture of some or all of these operations. The client enters one or more options to generate instructions for the server.

The step 106 is followed by a step 108 for providing options to apply instructions for the registered user ID. Examples of instructions include but not limited to mathematical operations logical operations, locating operations, selection operations, mixing values operations, or any mixture of some or all of these operations.

The step 108 is followed by a step 110 for storing the information in the data storage upon validation by the server. Examples of data storage includes but not limited to databases and files located on any devices virtual or physical. The step 110 completes the registration process of the client. Further, the following steps explain about the initiation of authentication process till the completion of verification process of client by the server.

The step 110 is followed by a step 112 for deriving a base value by the server. In a preferred embodiment, the base value depends upon the information provided by the client in the step 102, the step 104, the step 106 and the step 108. In a preferred embodiment, the client enters one or more options to generate one or more base values to the server. Examples of base value include but not limited to numeric value(s), alphabets, characters, alphanumeric value, images, text, colors and/or matrix containing some or all of them. In another preferred embodiment, the server would randomly pick or generate values for the base value.

Examples of one or more static values, the variable values and the base value include but not limited to numeric values, alphabets, characters and alphanumeric value, date, century, year, month, week, season of the year, day of the year, month or week, rainbow (it has certain numbers of colors and each colors has a code in various systems), time from common sources or timestamp from server's or client's system, age, anniversary of an event, measurements of distance, time, currency, weight, capacity, area, numbers or words or letters in a sentence or number of letters in a word or a captcha value.

The step 112 is then followed by a step 114 for applying instructions on the static value, the variable value and the base value to generate the password. In a preferred embodiment of the present invention, with reference to the step 106 and step 108; wherein the client provides option for generating and applying instructions. Thus, the server applies instructions on the static value, the variable value and the base value.

The step 114 is then followed by a step 116 for providing the generated password in the server and by the client. In the step 116, the generated password is submitted into the server by the client for the verification and authentication process The step 116 is then followed by a step 118 for generating a random password by the server. The random password generated by the server should be identical to the generated password provided to the server by the client.

The step 118 is followed by a step 120 for verifying the generated password with the random password generated by the client. The verification process is processed by the server. On successful verification of the generated password with the random password by the server, the client is authenticated by the server.

In another embodiment of the present invention, if the client is not verified (as from step 120) due to wrong password provided by the client, then a step 122 provides an option of re-entering the password when the generated password is different from the random password. In another preferred embodiment of the invention, every time a facility to re-enter the password is given to the client, a new version of base value would be presented by the server.

In another embodiment of the present invention, as per step 124, the registration of user ID is disabled upon entering of a wrong password for a predetermined times. For example if a client provides a wrong password for consecutively more than three or five times then the user ID is disabled. Thus, the client will have to use other means to contact the service provided and undergo the provider's applicable procedures to enable the registration in order to operate the server.

To summarize, the step 102 to the step 110 falls under Registration of a client onto the server and the step 112 to the step 124 falls under Sign In and Authentication of the user onto the server.

However it is to be noted the step 102 for registration is a preferred embodiment and the novelty of the system is independent of the registration process of a client. Those who skilled in the art would appreciate that the method 100 may be performed without step 102 i.e. registration of the client, without deviating from the scope of the present invention.

FIG. 2 is a block diagram 200 for indicating an example of generating a dynamic password. As shown, the static value is 4951, the first variable value is 5 (Friday—$5^{th}$ day of the week), the second value is 3 (Date of Joining, May 3, 2013) as provided by the client. Further, the base value is a matrix. The matrix is explained in detailed in conjunction with FIG. 3 of the present invention.

The next step is to apply instructions on the static values and variable values by the server. In an exemplary embodiment as shown in the block diagram 200, the instructions are as follows:

1st digit of the Static Value
1st Variable Value
2nd digit of the Static Value
3rd digit of the Static Value
4th digit of the Static Value
2nd Variable Value Thus, the value generated after applying instructions is 459513.

As per set instructions/options the letters from the Matrix are located by using each number in the constructed value for both coordinates (horizontal and vertical).

So:
1st letter coordinate 4×4: 'H'
2nd letter coordinate 5×5: 'O'
3rd letter coordinate 9×9: 'G'
4th letter coordinate 5×5: 'O'
5th letter coordinate 1×1: 'Y'
6th letter coordinate 3×3: 'S'
The generated password: HOGOYS
The generated password matches with the random password and thus the client is authenticated.

FIG. 3 is an exemplary embodiment of deriving generated password through a matrix 300. In exemplary embodiment, the matrix would have mixture of various values and coordinates for the client to locate those values. Examples of values include numbers, letters or symbols etc. The values are generated by the server. Each value in the matrix replicates random multiple places to prevent guessing which exact coordinate were used by the client to select value that was used by the client that is used to construct password. This is done in event if someone monitors the process of generated password by the client or intercepts the transmissions of the facility with matrix, instructions and password. Every time the server generates a matrix from randomly chosen values for having variations of coordinates associated with matrix. All this would allow unpredictability of which matrix would be presented to the client for generating password process and therefore impossible to reverse engineer by malicious party.

Furthermore, in another preferred embodiment the system for independently generating a dynamic password by a client and a server for subsequent verification of the generated password by either the server or the client may also be used. The system includes a data storage accessible to the server and a processor connected to the server and the data storage. The processor is configured to process the steps of method 100 (with reference to FIG. 1). Examples of data storage includes but not limited to memory card, read-only memory (ROM), flash memory, dynamic random access memory (DRAM) (such as synchronous DRAM (SDRAM) or Rambus DRAM (RDRAM), static random access memory (SRAM) etc or on any other devices virtual or physical.

Examples of processor includes but not limited to one or more special-purpose processing devices such as an application specific integrated circuit (ASIC), a field programmable gate array (FPGA), a digital signal processor (DSP), network processor, virtual processor etc. The processor represents one or more general-purpose processing devices such as a microprocessor, central processing unit, or the like.

Hereinafter, three examples are presented for explaining the embodiments of the present invention in further details.

Example 1

The static value is 4951, the first variable value is 5 (Friday—$5^{th}$ day of the week), the second value is 3 (Date of Joining, May 3, 2013) and the base value is a matrix (as shown in FIG. 3).

The instruction for deriving the password is first the static value and then variable value for vertical coordinates and for horizontal coordinates first variable and then static values. Thus putting the values in the base value i.e. matrix (as shown in FIG. 3). Hence, one axis would be 495153 and on another axis would be 534951.
So:
1st letter coordinate 4×5: 'S'
2nd letter coordinate 9×3: 'Y'
3rd letter coordinate 5×4: 'J'
4th letter coordinate 1×9: 'J'
5th letter coordinate 5×5: 'O'
6th letter coordinate 3×1: 'O'
The generated password: SYJJOO
Thus, if the generated password is same as the random password, then the client is authenticated.

Example 2

The static value is 4951, the first variable value is 5 (Friday—$5^{th}$ day of the week), the second value is 3 (Date of Joining, May 3, 2013) and the base value is a phrase or text.

In example 2, the phrase or text is "In today's world where a lot of interactions between different parties like people and computer systems are fact of life, one of the main concerns is how to identify each party."

The first instruction for deriving the password is as follows:
1. 1st digit of the Static value—4
2. 1st Variable value—5
3. 2nd digit of the Static value—9
4. 3rd digit of the Static value—5
5. 4th digit of the Static value—1
6. 2nd Variable value—3

The second instruction for deriving the password is to locate letters in the base value and the letters would start with the word number indicated by $2^{nd}$ variable (in this case, number 3), hence: 'world where a lot of interactions . . . '
Hence the password would be as follows:
4-l, 5-d, 9-r, 5-d, 1-w, 3-r, thus the password is 'ldrdwr'.
Thus, if the generated password is same as the random password, then the client is authenticated.

Example 3

The static value is 4951, the first variable value is 5 (Friday—$5^{th}$ day of the week), the second value is 3 (Date of Joining, May 3, 2013) and the base value is a series of a number. For example 3, the base value is 258649.
First set of instructions remain the same as in Example 2 and thus the derived value is 459513.
  Second set of instructions are as follows:
    Each digit of the constructed value should be applied arithmetically separately to the digit in the corresponding position in Base Value
    For each digit pair
      If Base Value digit is even number, use arithmetical operation add and If Base Value digit is odd number, use arithmetical operation subtract to determine intermediate result 1.
      If the value of the single arithmetic operation in intermediate result 1 is even number then subtract 1 and If the result of the single arithmetic operation in intermediate result 1 is odd number then add 2
      In the event the resulted number is negative, disregard the negative sign
    For the Password use only the last digit of each resulted number
    Following table describes the value derived from the second set of instructions.

| Base Value | 2 | 5 | 8 | 6 | 4 | 9 |
|---|---|---|---|---|---|---|
| Utilized Value | 4 | 5 | 9 | 5 | 1 | 3 |
| Intermediate result 1 | 6 | 0 | 17 | 11 | 5 | 6 |
| Intermediate result 2 | 5 | −9 | 19 | 13 | 7 | 5 |
| Generated Password | 5 | 9 | 9 | 3 | 7 | 5 |

Here as per the second set of instructions, if base value is an even number, then utilized value is added to the base value and if base value is an odd number, then utilized value is subtracted to the base value and thus the 'intermediate result 1' to 6, 0, 17, 11, 5 and 6. Further, as per second instructions, if the single arithmetic operation is even number then subtract 1 and if the single arithmetic operation is odd number then add 2, thus the 'intermediate result 2' is 5, −9, 19, 13, 7 and 5. Further, disregarding the negative sign, therefore the generated password is 599375.
Thus, if the generated password is same as the random password, then the client is authenticated.

However, it will be readily apparent to those with ordinary skill in the art that the password may be generated with various other values of static value, variable value and base value as well as different sets of instructions, without deviating from the scope of the present invention.

The present invention offers various advantages. The present invention allows utilization of very simple key value which is easily remembered and actually can be the same across various server environments without jeopardizing security. Further, the system allows independent dynamic password generation by client in the same manner as by the server without any tie to any physical devices, only server side is tied to devices. Furthermore, the generated password is always of different values and the invention allows it to be observed and transmitted freely and openly without jeopardizing security as it will be of no use for any subsequent submissions.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

The invention claimed is:

1. A method of independently generation of dynamic password by a client and a server for subsequent verification, said method comprising the steps of:
    registering a user identification (ID) for identification of the client and associating client's related information;
    providing one or more static values and options to generate one or more variable values for the registered user ID, wherein the static values are one or more alphanumeric value or characters entered by the client, which are used to derive the variable values based on the options selected by the client;
    providing options to generate instructions for the registered user ID;
    providing options to apply instructions for the registered user ID;
    storing the information in the data storage upon validation by the server;
    deriving a base value by the server;
    applying instructions on the one or more static value, the one or more variable value and the base value to generate the password;
    providing the generated password to the server by the client;
    generating, a server generated password by the server by applying instructions on the one or more static value, the one or more variable value and the base value to generate the server generated password;
    verifying the generated password with the server generated password, by the client,
    wherein in response to successful verification of the server generated password with the password generated and provided by the client, the client is authenticated by the server, and
    in response to an unsuccessful verification of the server generated password with the password generated and provided by the client, the client is granted at least one additional attempt to generate random password or upon set number of fails the client user ID is disabled.

2. The method according to claim 1 wherein the one or more static value and the one or more variable value is provided by said client.

3. The method according to claim 1 wherein the base value is a matrix for generating the random password.

4. The method according to claim 1 wherein the one or more static values, one or more variable values and the base value may either be numeric value(s), alphabets, characters, alphanumeric value, images and/or matrix containing some or all of them.

5. The method according to claim 1 wherein the random password is generated by applying instructions on either one or more static value, the one or more base value, the one or more variable value or any mixture of some or all of these values.

6. The method according to claim 1 wherein the instructions may either be mathematical operations, logical operations, locating operations, selection operations, mixing values operations, or any mixture of some or all of these operations.

7. The method according to claim 1 further comprising the step of providing an option of re-entering the password when the verification step fails.

8. The method according to claim 1 further comprising the step of disabling the registration of user ID on entering of wrong password for a predetermined times.

9. A system for independently generating a dynamic password by a client and a server for subsequent verification of the generated password by either the server or the client, said system comprising:
    a memory device accessible to the server;
    a processor connected to the server and the memory device, said processor configured to:
    register a user identification (ID) for identification of the client and associating client's related information;
    provide one or more static key values and options to generate one or more variable values for the registered user ID, wherein the static values are one or more alphanumeric value or characters entered by the client, which are used to derive the variable values based on the options selected by the client;
    provide options to generate instructions for the registered user ID;
    provide options to apply instructions for the registered user ID;
    store the information in the data storage upon validation by the server; derive a base value by the server;
    apply instructions on the one or more static value, the one or more variable value and the one or more base value to generate the password;
    provide the generated password to the server by the client;
    generate, a server generated password by the server by applying instructions on the one or more static value, the one or more variable value and the base value to generate the server generated password;
verify the generated password with the server generated password, by the client, wherein
    in response to successful verification of the server generated password with the password generated and provided by the client, the client is authenticated by the server, and
    in response to an unsuccessful verification of the server generated password with the password generated and provided by the client, the client is granted at least one additional attempt to generate random password or upon set number of fails the client user ID is disabled.

10. The system according to claim 9 wherein the one or more static value and the one or more variable value is provided by said client.

11. The system according to claim 9 wherein the base value is a matrix for generating the random password.

12. The system according to claim 9 wherein the one or more static value, the one or more variable value and the base value may either be numeric value, alphabets, characters and alphanumeric value, images and/or matrix containing some or all of them.

13. The system according to claim 9 wherein the instructions may either be mathematical operations, logical operations, locating operations, selection operations, mixing values operations, or any mixture of some or all of these operations.

14. The system according to claim 9 wherein the processor is further configured to provide an option of re-entering the password when the generated password is different from the random password.

15. The system according to claim 9 further comprising the step of disabling the registration of user ID on entering of wrong password for a predetermined times.

\* \* \* \* \*